Figure 22:
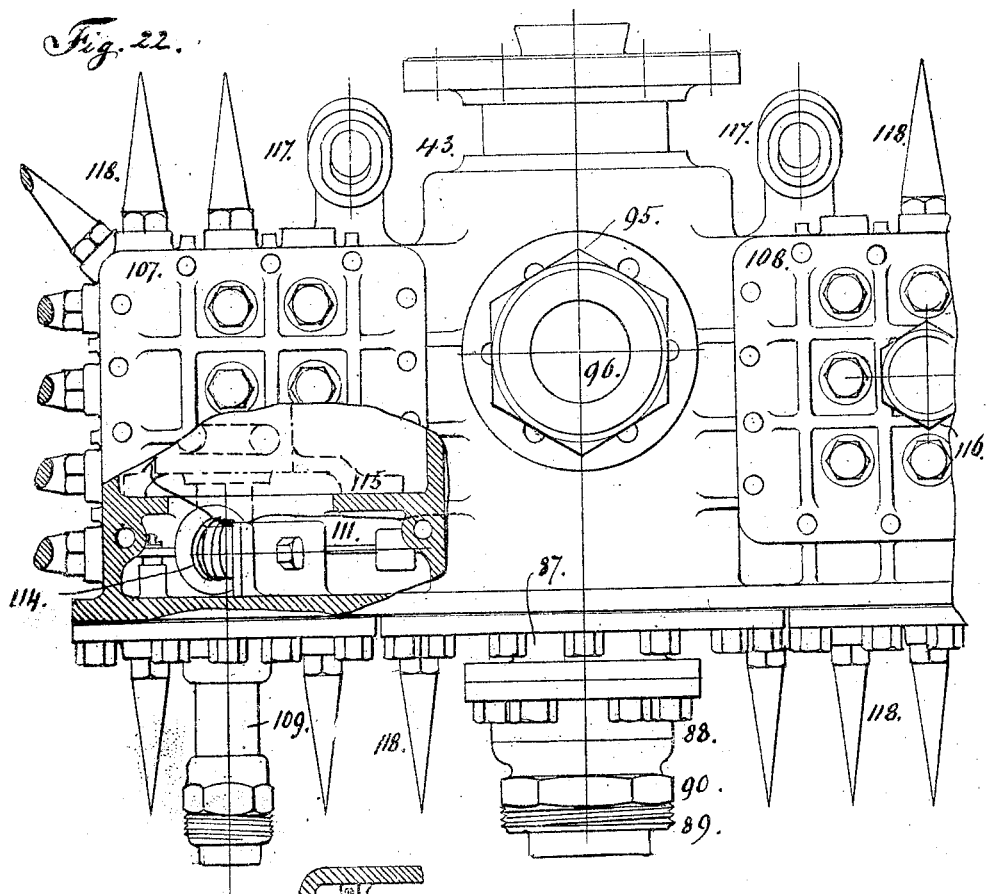

No. 818,489. PATENTED APR. 24, 1906.
E. A. TRAPP.
TELESCOPE.
APPLICATION FILED NOV. 14, 1904.
7 SHEETS—SHEET 1.
Fig. 1.
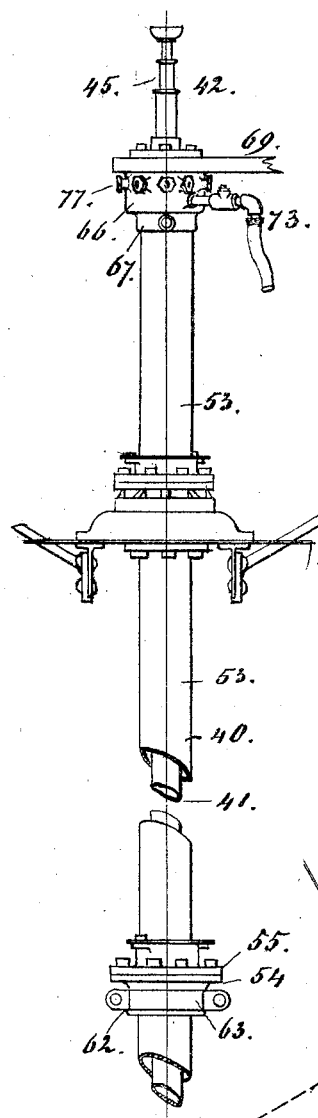
Fig. 2.
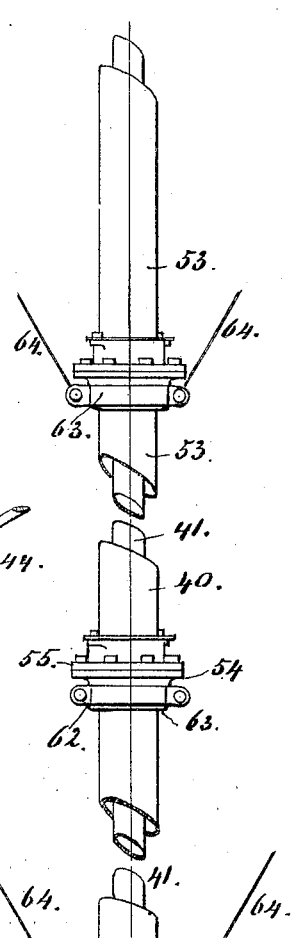
Fig. 3.
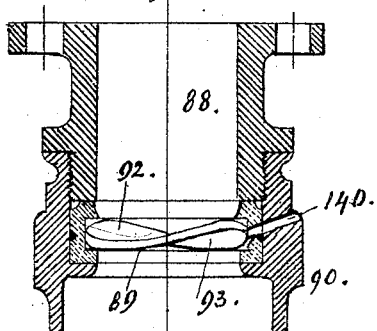
Fig. 4.
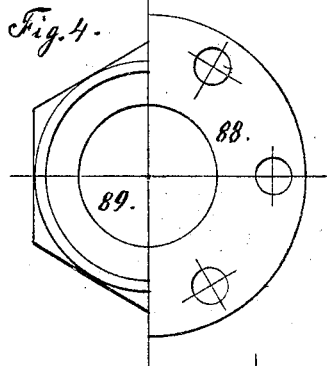
Fig. 5.
Fig. 6.
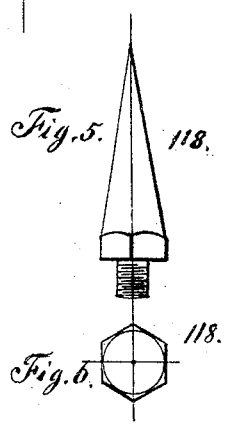
WITNESSES:
Herman Gustow.
Arthur Marion.
INVENTOR
Edward A. Trapp.
BY
Chas. C. Gill
ATTORNEY No. 818,489. PATENTED APR. 24, 1906.
E. A. TRAPP.
TELESCOPE.
APPLICATION FILED NOV. 14, 1904.
7 SHEETS—SHEET 2.
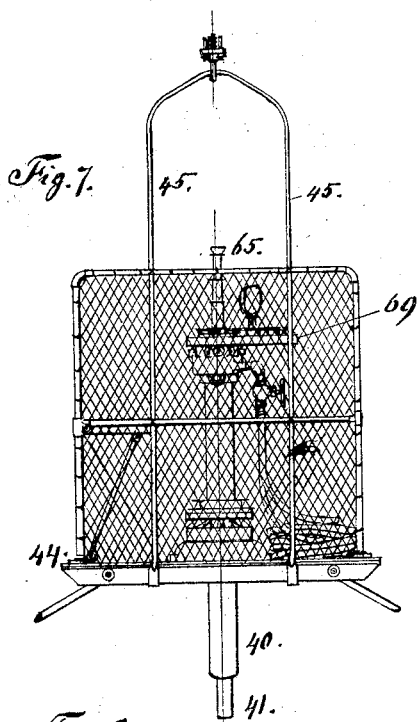
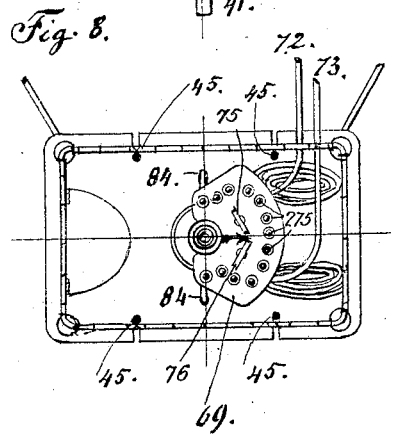
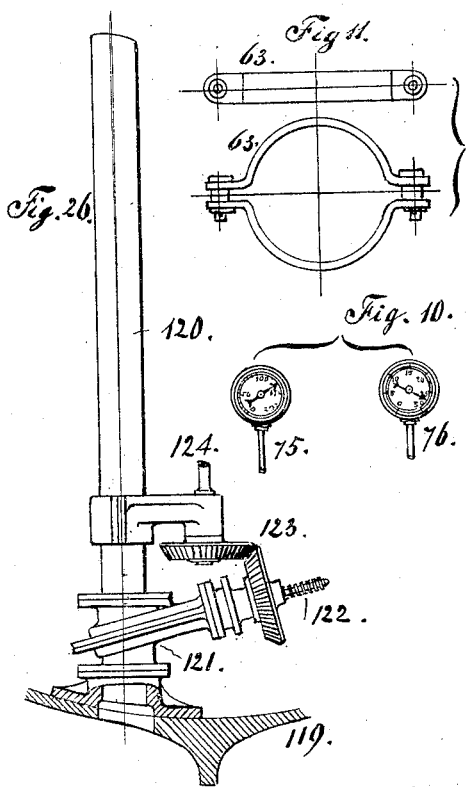
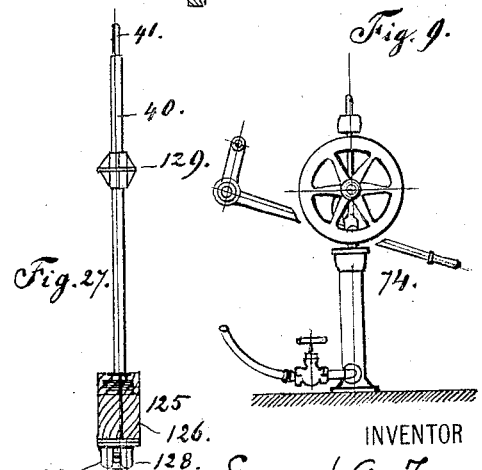
WITNESSES:
Herman Gustow.
Arthur Marion.
INVENTOR
Edward A. Trapp.
BY Chas. C. Gill
ATTORNEY No. 818,489. PATENTED APR. 24, 1906.
E. A. TRAPP.
TELESCOPE.
APPLICATION FILED NOV. 14, 1904.
7 SHEETS—SHEET 3.
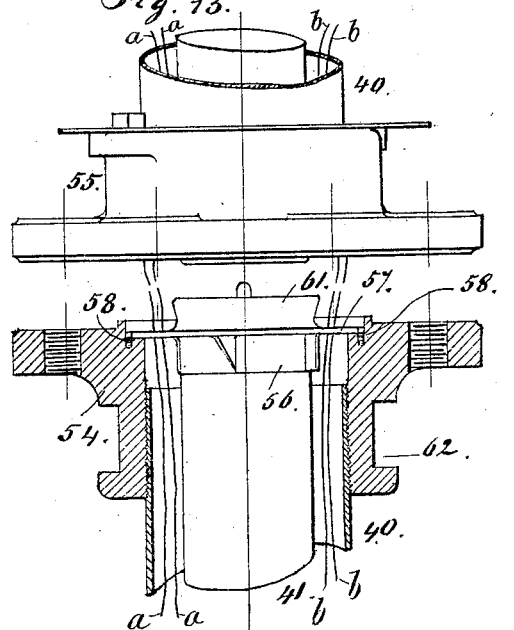
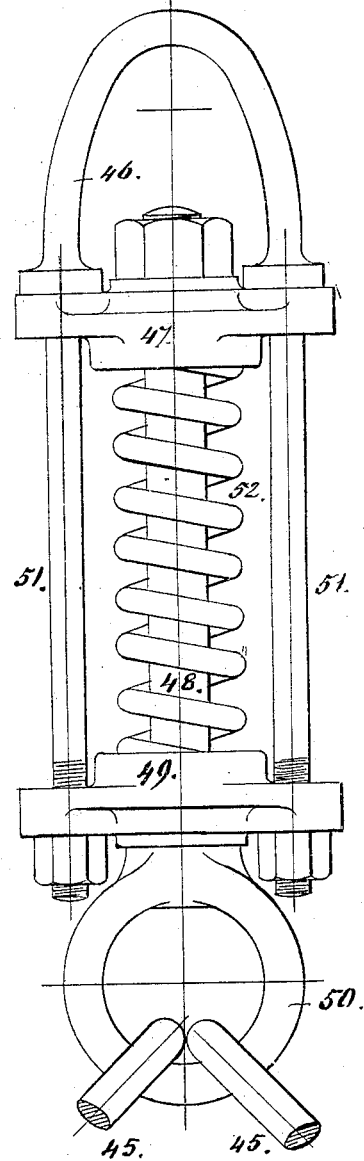
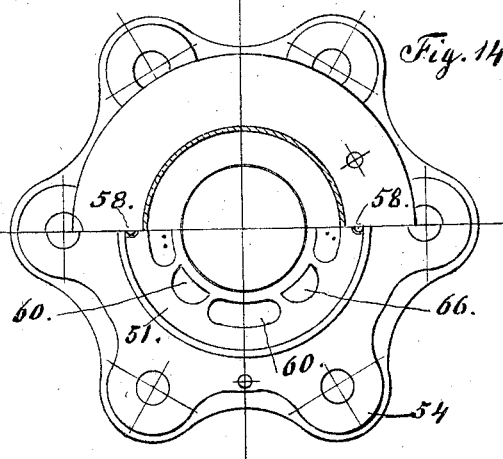
WITNESSES:
Herman Gustow.
Arthur Marion.
INVENTOR
Edward A. Trapp.
BY
Chas. O. Gill
ATTORNEY No. 818,489. PATENTED APR. 24, 1906.
E. A. TRAPP.
TELESCOPE.
APPLICATION FILED NOV. 14, 1904.
7 SHEETS—SHEET 4.
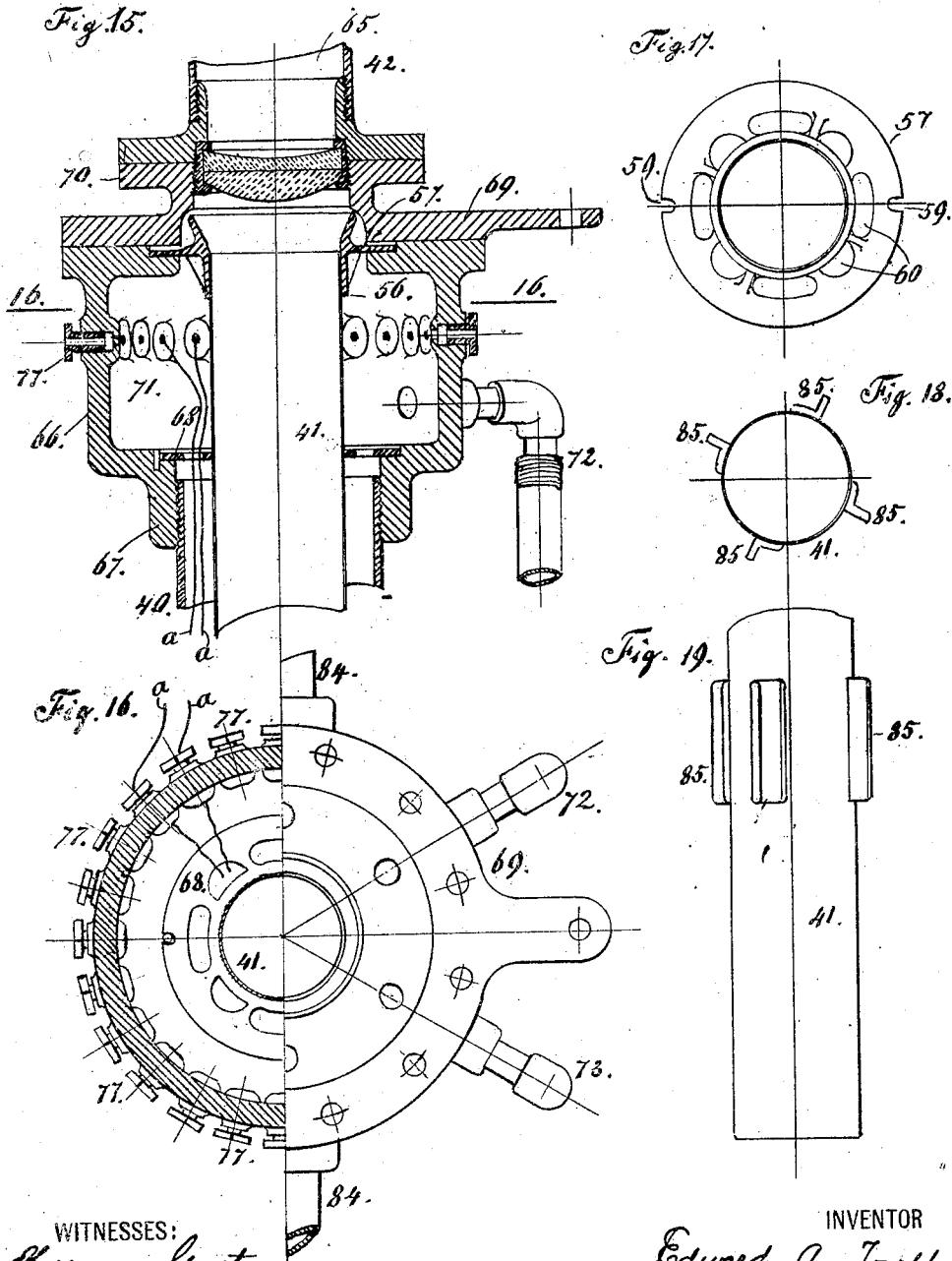
WITNESSES:
Herman Gustow.
Arthur Marion.
INVENTOR
Edward A. Trapp.
BY
Chas. E. Gill
ATTORNEY

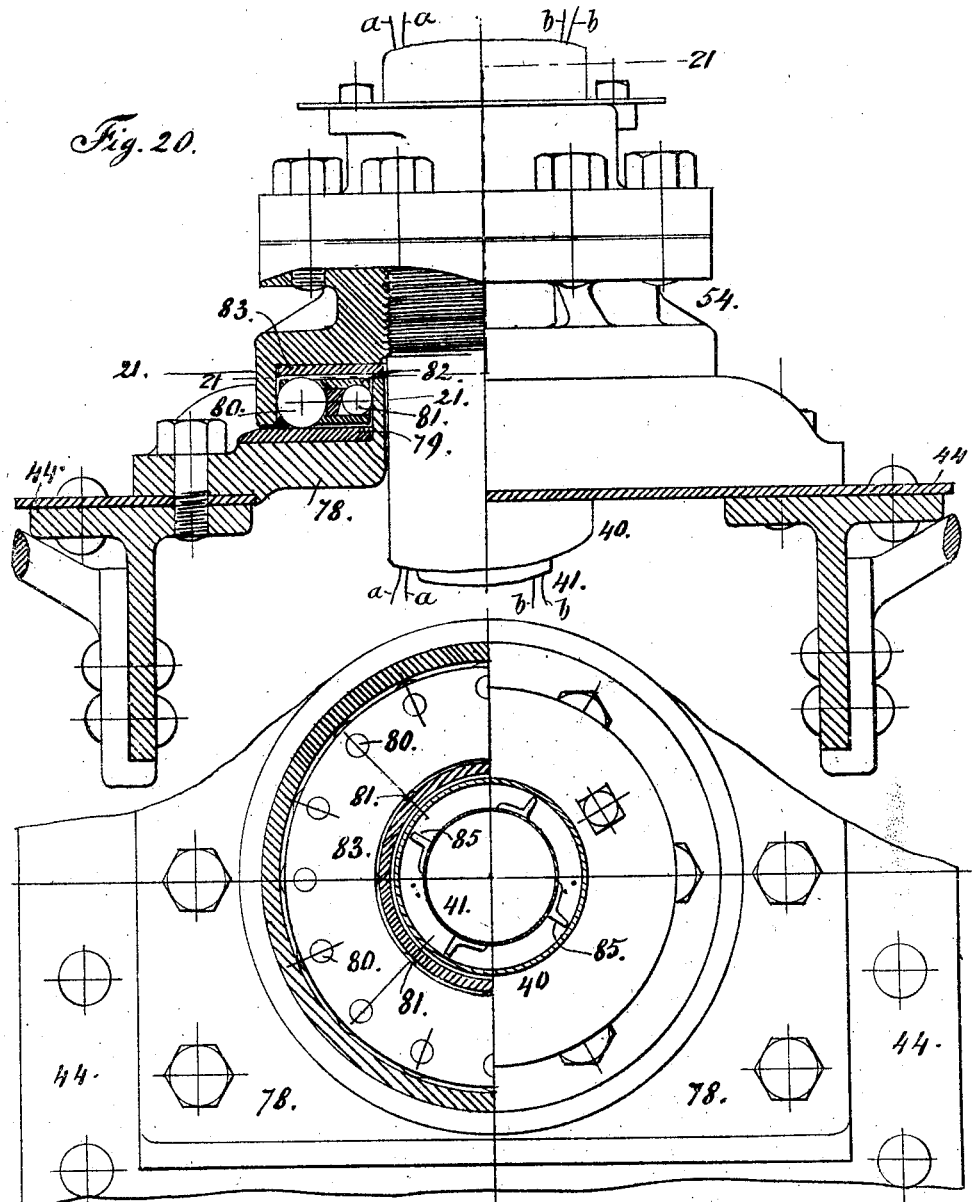

No. 818,489. PATENTED APR. 24, 1906.
E. A. TRAPP.
TELESCOPE.
APPLICATION FILED NOV. 14, 1904.

7 SHEETS—SHEET 6.

WITNESSES:
Herman Gustow
Arthur Marion

INVENTOR
Edward A. Trapp.
BY
Chas. C. Gill
ATTORNEY

No. 818,489.

PATENTED APR. 24, 1906.

E. A. TRAPP.
TELESCOPE.
APPLICATION FILED NOV. 14, 1904.

7 SHEETS—SHEET 7.

WITNESSES:
Herman Gustow
Arthur Marion

INVENTOR
Edward A. Trapp
BY
Chas. C. Gill
ATTORNEY

UNITED STATES PATENT OFFICE.

EDWARD A. TRAPP, OF NEW YORK, N. Y.

TELESCOPE.

No. 818,489. Specification of Letters Patent. Patented April 24, 1906.

Application filed November 14, 1904. Serial No. 232,591.

*To all whom it may concern:*

Be it known that I, EDWARD A. TRAPP, a citizen of the United States, and a resident of New York city, in the county of New York and State of New York, have invented certain new and useful Improvements in Telescopes, of which the following is a specification.

The invention relates to improvements in telescopes and in the combination therewith of apparatus for photographing the objects observed through the telescope, and while my invention is not limited in every instance to the observation and photographing of objects located in the water or at the bottom of rivers or the ocean the apparatus invented by me is especially adapted for such uses.

My invention is presented in this application as embraced in a submarine telescope, to which, when desired, may be applied apparatus for photographing the objects observed.

My invention comprises the various features and arrangements of parts hereinafter described and claimed, and in its preferred and most complete form the apparatus of my invention comprises an exterior tube composed of sections connected together by air-tight joints, an inner observation-tube, a magnifying-lens or magnifying-lenses at the eyepiece of the instrument, a box at the objective end of the instrument, an objective lens carried by said box in line with the said inner tube, a horizontally-disposed tube carrying an objective-lens connected with said box, a reflector within said box and adapted to be moved from over the first-mentioned objective-lens and to close said horizontal tube, so that an observation straight through the instrument may be made or returned over said first-mentioned objective lens and caused to stand at an angle of forty-five degrees to said horizontal tube, so that an observation in a horizontal direction may be made, means for photographing the objects observed through the medium of either of said lenses, means for illuminating the region about the objective end of the instrument, means for operating said reflector, said photographic apparatus, and said illuminating means from above the surface of the water, means for extracting the air from within the tubes of the instrument, so as to prevent condensation on the lenses and imperfect observations, and means for mounting said instrument so that it may be turned axially for the purpose of permitting the horizontal observation to be carried on in any direction, all as hereinafter fully described.

The instrument of my invention may be supported in any manner desired or found most convenient, and in the drawings I illustrate two methods of supporting and arranging the same, one being by means of a platform or cage yieldingly suspended from yardarms or otherwise at the side of a vessel and the other by means contained within the vessel, the instrument being extended down through a proper vertical opening made in the hold of the vessel.

The invention and satisfactory means for carrying the same into effect will be fully understood from the detailed description hereinafter presented, reference being had to the accompanying drawings, in which—

Figure 23:
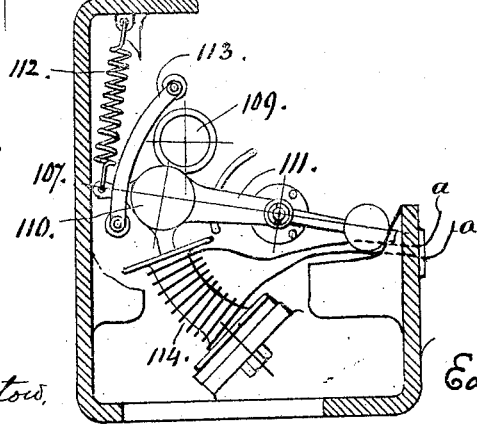
Figure 24:
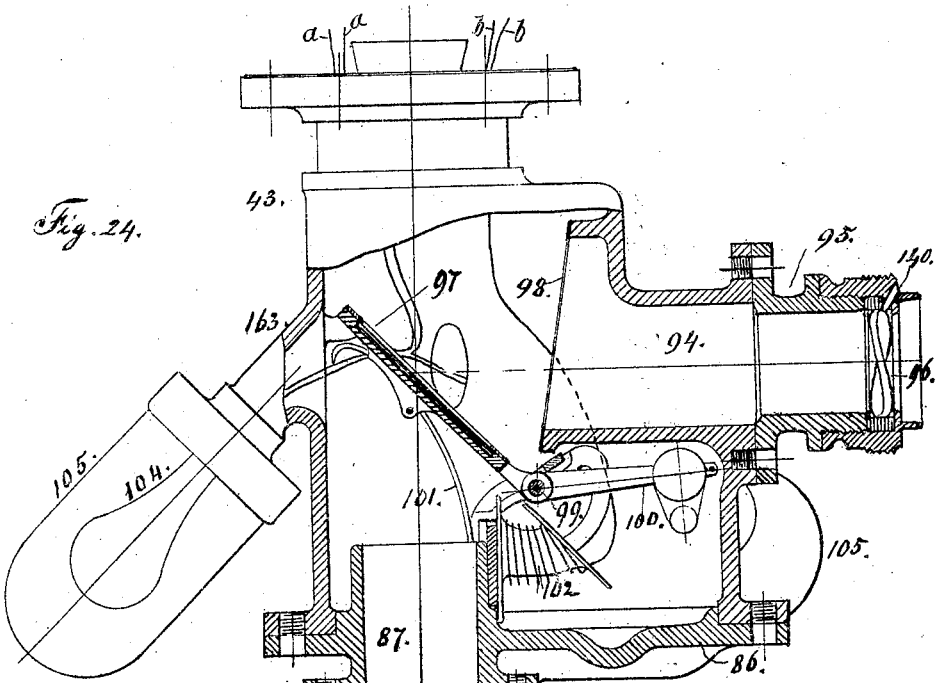
Figure 25:
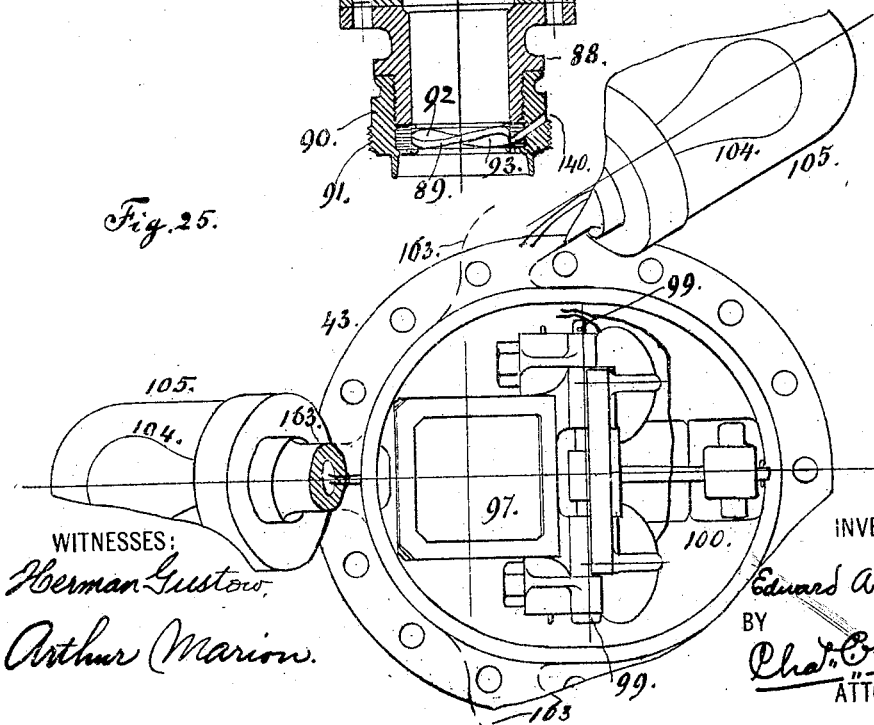

Figure 1 is a side elevation, partly broken away, of the upper portions of the instrument. Fig. 2 is a like view of the middle and lower portions of the instrument, this figure being a continuation of Fig. 1. Fig. 3 is an enlarged detached central vertical section of the means for holding the objective or collecting lens at the lower portion of the instrument, this lens being shown as a double concave cylindrical lens with the concavities thereof extending at right angles to each other. Fig. 4 is an elevation showing in its right-hand half the top of Fig. 3 and in its left-hand half the bottom of Fig. 3. Fig. 5 is an enlarged detached side elevation of one of the spurs applied to the box at the objective end of the instrument to protect the same against attacks of inhabitants of the sea. Fig. 6 is a top view of same. Fig. 7 is a detached side elevation of the suspended platform or cage supporting the instrument with the electric switchboard and other devices connected therewith. Fig. 8 is a top view of same. Fig. 9 is a detached side elevation, partly broken away, of a pump for extracting the air from within the telescope, so that no condensation shall take place therein or on the lenses thereof, said pump being also capable of use as a force-pump to blow out any foreign matter from the tubes when desired. Fig. 10 shows detached elevations of the vacuum and pressure gages located on the switchboard at the upper portion of the instrument. Fig. 11 shows a side and a top view of one of the bands applied upon the outer tube of the instrument to receive the lower ends of ropes for maintaining the instrument. Fig. 12 is an enlarged detached side elevation of a spring-hanger by which the platform or cage at the upper portion of the instrument may be yieldingly suspended. Fig. 13 is a detached side elevation, partly broken away and partly in section, of a portion of the tubes of the instrument and showing more particularly the coupling for connecting the sections of the outer tube in an air-tight manner, the upper portion of Fig. 13 showing in side elevation the upper member of the coupling and the lower portion thereof showing in vertical section the lower member of said coupling. Fig. 14 is a view taken from the top of Fig. 13 with one-half of the upper coupling member cut away to disclose the top of one-half of the lower coupling member. Fig. 15 is a central vertical section, partly broken away, of the upper portion of the instrument. Fig. 16 is a view taken from the top of Fig. 15 with the left-hand half in section on the line 16 of Fig. 15. Fig. 17 is a detached top view of an inner coupling member connected with the inner tube and at its outer edges engaging a coupling on the outer tube of the instrument, this coupling member serving to maintain the inner tube centrally within the outer tube and being provided with vertical openings through which the electric wires may pass. Fig. 18 is a top view of a portion of the inner tube and is presented to show the spacing-flanges thereon to aid in maintaining the inner tube centrally within the outer tube and to keep the electric wires properly separated from one another. Fig. 19 is a side elevation, partly broken away, of same. Fig. 20 is a sectional elevation of that portion of the instrument adjacent to the floor of the supporting cage or platform and is presented to illustrate the turn-table by means of which the entire instrument may be turned axially when desired. Fig. 21 is a top view, partly in section, of same, the left-hand half of Fig. 21 being in section on the dotted line 21 21 of Fig. 20. Fig. 22 is a detached side elevation, partly in vertical section, of one form of box for the objective end of the instrument, this box carrying the lenses, reflector, electric lamps, and photographic apparatus. Fig. 23 is a horizontal section through an end portion of same, this section being intended more particularly to disclose the photographic apparatus. Fig. 24 is a side elevation, partly in vertical section, of a box for the objective end of the instrument, this box carrying the lenses, reflector, and electric lamps, but omitting the photographic apparatus. Fig. 25 is a top view of the lower portion of same, the upper portion of the casing being omitted to more fully disclose the interior parts inclosed by the box. Fig. 26 is a sectional view through a portion of a vessel and is presented to show a method of utilizing the telescope in taking observations directly below the vessel. Fig. 27 is a detached side elevation of a portion of the telescope projected below the bottom of the vessel shown in Fig. 26, and Fig. 28 is an elevation of the lower or objective end of same.

In the drawings, 40 designates the exterior barrel or tube of the instrument; 41, the interior tube through which observations are made; 42, the eyepiece portion of the instrument; 43, a box at the objective end of the instrument and containing the collecting or objective lenses and photographic apparatus, and 44 the platform, cage, or cradle by means of which the entire instrument may be supported and upon which the person operating the instrument may stand or be seated. The platform 44 may be simply a suspended platform surrounded by railing, as shown, or a float or a deck. In the present instance I illustrate the platform 44 as a suspended platform, the same being provided with the upwardly-extending rods 45, Figs. 7 and 8, adapted to be suspended from a spring-hanger of the character shown in Fig. 12, this hanger comprising the loop 46, slide 47, sliding rod 48, connected with the slide 47 and adapted to move through a stop-plate 49, a ring 50, connected with the lower end of said rod 48 and receiving the rods 45, guide-rods 51, on which the slide 47 moves and is guided, and a coiled spring 52, confined between the slide 47 and stop-plate 49. The weight of the platform 44 and of the parts suspended therefrom will operate to pull the slide 47 downwardly against the spring 52 and enable the latter to cushion the entire instrument, and this is a feature of advantage, since it will relieve the instrument from unnecessary jarring or swaying action and make it convenient for the operator to keep his eye at the eyepiece portion of the instrument at times when the sea is rough. The hanger (shown in Fig. 12) may be suspended in a hinged manner from a boom, yard-arm, or other support extended outwardly from the side of a vessel.

The body 40 or tubular barrel of the instrument is composed of a series of sections 53, united together in an air-tight manner by couplings whose construction is more clearly illustrated in Figs. 1, 2, 13, and 14, and which couplings each comprise a lower member 54, secured to the upper end of one of the sections 53, and an upper member 55, secured to the lower end of the adjoining section 53. The coupling members 54 55 are of cast metal, and the ends of the sections 53 are secured to them by screw-threads and solder, so as to form air-tight joints. The coupling members 54 55 upon connecting the sections 53 are bolted together in a usual manner, as illustrated. The inner tube 41 is also composed of a series of sections corresponding with the exterior sections 53 and secured at their ends within the coupling members 54 55. The means for securing the ends of the sections of the inner tube 41 are more clearly illustrated in Figs. 13, 15, 16, and 17 and comprise a tubular frame 56, having a horizontal flange 57 extending outwardly upon the coupling member 54 and seated within a recess formed therein. The plate 57 is prevented from turning axially independently of the coupling member 54 by means of studs 58, Fig. 13, which are rigid with the coupling member 54 and enter recesses 59, Fig. 17, formed in the edge of said plate 57. The tubular portion of the frame 56 has the end of the inner tube-section fastened within it, and the flange portion 57 of said frame maintains the inner tube concentrically within the outer tube and in addition is formed with vertical openings 60, Fig. 14, through which the electric wires may pass and be kept properly separated from one another, my purpose being that these wires, which will be utilized for creating the illumination and operating the photographic apparatus, shall pass through the space intermediate the outer tube 40 and inner tube 41. The frame 56 is also formed with an upwardly-extending tubular portion 61, Fig. 13, which will receive the lower end of the next adjacent section of the tube 41, and thereby aid in maintaining said end in proper alinement within the exterior tube 40.

The coupling members 54 are formed with annular grooves 62, Fig. 13, to receive the metallic bands 63, Figs. 1, 2, and 11, which are composed of two corresponding parts connected together by bolts, as shown in Fig. 11, and receiving between their adjacent ends and upon said bolts the lower ends of the cables 64, Fig. 2, by which the instrument may when desired be maintained free from contact with the side of a vessel from which the platform 44 may be suspended. The bands 63 may tightly fit the coupling members 54, if desired; but when it is intended to mount the instrument so that it may be turned axially the bands 63 should lie loose within the grooves 62 of the coupling members 54, so that the cables 64 may not interfere with the axial turning back and forth of the instrument.

At the eyepiece 42 of the instrument is provided a telescope 65, with its lenses or other suitable enlarging lenses, my invention not being limited to the special lenses which may be applied to the eyepiece portion of the instrument.

Immediately below the eyepiece portion 42 of the instrument I provide a box 66, Fig. 15, having at its lower portion a dependent flange 67 to receive in an air-tight manner the upper end of the exterior tube or barrel 40. At the upper inner portion of the box 66 is secured one of the frames 56, hereinbefore referred to, to receive the upper end of the inner tube 41, which tube is in direct alinement with the eyepiece portion of the instrument.

Surrounding the inner tube 41 within the lower portion of the box 66 is a plate 68, which aids in maintaining the tube 41 centrally within the exterior tube 40 and contains vertical openings, Figs. 15 and 16, through which the electric wires may pass. Upon the upper end of the box 66 is provided a plate 69, and this plate is formed with a flange 70, to which is secured the lower end of the eyepiece portion of the instrument, and all of the joints about the box 66 and plate 69 are air-tight. The box 66 forms within it a chamber 71, which is in communication with the outer tube 40 and inner tube 41, and to this chamber 71 I connect two pipes 72 73, which may lead to a pump 74, Fig. 9, by means of which I may create a vacuum within the chamber 71 and tubes 40 41 or force air within said chamber and tubes, so as to drive out any foreign matter which may at the time be therein, said tube 72 being a vacuum-tube and the tube 73 being provided for forcing air into the instrument. I regard it of great importance to provide means for extracting the air from within the tubes 40 and 41, and especially from within that portion of the instrument containing the various lenses, because by extracting the air from these parts condensation on the lenses is prevented and more perfect images reflected. The prevention of condensation in the instrument also avoids corrosion of the metal parts. The essential feature is, however, to prevent condensation of air on the lenses, because such condensation would obscure the vision through the lenses and impair the utility of the instrument as a whole. The plate 69 constitutes a switchboard, and upon this plate I mount the gages 75 76, Fig. 10, to indicate the degree of vacuum or air-pressure within the chamber 71, and also a series of electric buttons 275 (indicated in Figs. 7 and 8) for the electric wires used for purposes of illumination and photographing at the objective end of the instrument. The circuit-wires from the switchboard 69 will extend through insulated posts or tubes 77, provided in the vertical sides of the box 66, as shown in Fig. 15. The electric buttons 275 on the switchboard 69 and the posts 77, carried by the box 66, and the electric wires, being of usual and familiar form and construction, do not require any special description herein, for which reason the electric wires are only diagrammatically illustrated, the wiring in respect of the present invention being familiar practice.

Immediately above the floor of the platform or cage 44 I provide a turn-table, (shown more clearly in Figs. 20 and 21,) upon which the instrument as a whole may be supported and have an axial motion. This turn-table comprises a substantial base-plate 78, secured upon the platform 44 and having a race 79 to receive ball-bearings 80 81, upon which is disposed a plate 82, apertured at equidistant points, as shown in Fig. 21, to expose the upper portions of the balls 80 and riding upon the balls 81. Above the race 69 one of the coupling members 54 is located and formed with an annular recess containing a plate 83 to engage the ball-bearings 80, as shown in Fig. 20. The coupling member 54 (shown in Fig. 20) differs from the other coupling members 54 in that its lower portion is formed to constitute one part of the turn-table through which the exterior tube 40 and inner tube 41 extend free of the floor or platform 44 and plate 78, said tubes being supported by the coupling member 54 and being capable of being turned axially therewith. The purpose of so mounting the instrument that it may be turned axially will appear hereinafter in connection with the description of the lenses at the objective end of the instrument. The instrument is to be turned axially by the attendant standing on the platform 44, and to facilitate the axial turning of the instrument I provide the switchboard 69 with oppositely-projecting handles 84, as shown in Fig. 8.

During the axial turning of the instrument the inner tube 41 is compelled to move with the outer tube 40 by reason of the frames 56, hereinbefore referred to, being secured to the inner tube-sections and also to the coupling members 54, which are rigid with the outer tube-sections, and, as above explained, the inner tube 41 is kept centrally of the outer tube 40 by means of the flanges 57, connected with said frames 56, and through apertures in which flanges the electric wires pass to the space intermediate the inner and outer tubes. The inner tube 41 may also be provided with angle-iron plates 85, as shown in Figs. 18, 19, 21, for the purpose of centering the same within the outer tube 40 and of affording separated spaces through which the electric wires may pass.

The box at the objective end of the instrument may or may not be provided with photographic apparatus, as may be preferred, and the interior of the said box less the photographic apparatus is shown more clearly in Figs. 24 and 25, while the photographic apparatus is indicated more particularly in Figs. 22 and 23. Since the lenses are more clearly represented in Fig. 24, I will first describe the construction there shown. It is obvious that the exterior outlines of the box 43 are not of much importance, and preferably the said box will comprise two main portions, the upper portion affording a chamber and the lower portion a base 86, supporting as nearly as possible all of the interior parts of the box. In Fig. 24 the base 86 is shown as formed with a vertical tubular portion 87 in line with the inner tube 41 of the instrument, and fastened to the lower end of this portion 87 is an alined tube 88, carrying at its lower end the objective-lens 89, which is secured by the threaded sleeve 90, which may also be externally threaded, as at 91, to receive an ordinary cap, which may be, when desired, applied over the lens 89. The lens 89 is what I term a "double-concave cylindrical lens," having upper and lower concave surfaces 92 93, which extend at an angle to each other. The concavities 92 93 of the lens 89 will extend at a true right angle to each other when perfect reflections are desired; but in any instance in which a distorted reflection or picture is desired the concavities will extend at an angle other than a right angle to each other. The tube 88 is projected downwardly, and hence the lens 89 is intended for reflections and observations directly below or in line with the main instrument. At the side of the box 43 is provided a horizontally-disposed tube 94, to which is secured a short tubular section 95, carrying a lens 96, corresponding with the lens 89 just above described, and the lens 96, being projected horizontally from the side of the box 43, is intended for use in obtaining reflections or making observations in a direction at right angles to the main line of the instrument. The capacity of the instrument for horizontal reflections and observations is the reason for providing the turn-table hereinbefore described, upon which the instrument may be turned axially. In the absence of ability to turn the instrument axially the lens 96 could only reflect images directly in front of it, said lens then being stationary; but with the axial turning of the instrument it is obvious that the lens 96 may be pointed in any horizontal direction and its field of usefulness very greatly increased. Within the box 43 I provide a reflector-mirror 97, which in Fig. 24 is shown as disposed at an angle of forty-five degrees to the line of the horizontally-projected lens 96 and at an angle of forty-five degrees to the line of the inner tube 41, and when the reflector 97 is in this position the image transmitted through the lens 96 will be reflected through the inner tube 41, and at such time also the reflector conceals the lens 89 from the said inner tube 41. The reflector 97 will therefore be allowed to remain in the forty-five-degree angular position (shown in Fig. 24) only when it is desired to make observations in a horizontal direction by means of the lens 96. When it is desired to make observations vertically through the lens 89, the reflector 97 will be turned upwardly against the flange 98, surrounding the inner end of the tubular portion 94 of the box 43, and to admit of the convenient operation of the reflector 97 the latter is secured in a hinged manner upon a pin 99 and is provided with a weighted arm 100 and also with a spring 101. The weighted arm 100 normally tends to turn the reflector 97 upwardly toward the flange 98 against the stress of the spring 101, which normally acts to retain the reflector in its angular position, (shown in Fig. 24,) said spring being able to overcome the force of the weighted arm 100. In order to insure the upward turning of the reflector 97 from the position in which it is shown in Fig. 24 to position against the flange 98, I provide within the box 43 an electromagnet 102, which may be energized at the proper time by the attendant on the platform 44 for the purpose of attracting the weighted arm 100 and drawing the same downwardly against the stress of the spring 101, the electromagnet 102 when energized being capable of attracting to itself the said arm 100 and of holding said arm until deënergized, when it will release the arm 100 and the spring 101 will return the reflector 97 to its angular position shown. The electromagnet 102 will be under the control of the attendant on the platform 44, who will simply press one or more of the buttons on the switchboard 69 for energizing and deënergizing the said magnet. The wiring for the electromagnet 102 is indicated by the wires $b\ b$, which are of usual character.

I do not limit the invention in every instance to the employment of both the vertically and horizontally projected lenses 89 96; but it is obvious that the utility of the instrument is very much increased when both of these lenses are employed, nor do I limit the invention in every instance to the employment at the objective end of the instrument of the double cylindrical concave lenses shown; but I regard it as very advantageous to employ this special character of lens, owing to its efficiency, the fact that it is in one integral piece, and the readiness with which it may be manufactured with true cylindrical equal concave opposite faces and with the concavities extending at a right angle to each other. I believe that I am the first person to discover or utilize a double cylindrical concave lens of the character described, and I have made this specific lens the subject of a separate application for Letters Patent, said application having been filed November 7, 1904, and bearing Serial No. 231,677.

The box 43 at the objective end of the instrument is provided with suitable brackets or nozzles 163 to receive electric lamps 104, incased in suitable globes 105 for illuminating the region about the objective end of the instrument, and above the electric lamps 104 may, if desired, be provided a reflector-hood 106, as indicated by dotted lines in Fig. 2. The electric lamps 104 will be operated by an attendant on the platform 44, the wires for the lamps extending from the switchboard 69, thence into the chamber 71 of the box 66, and thence downwardly through the space intermediate the outer and inner tubes 41. It is intended that the lamp-globes shall when circumstances so require be of tinted glass or crystal, so that the light emanating through the same may neutralize the color of certain waters prejudicial to securing clear reflections.

The instrument may, as above indicated, be employed with or without apparatus for photographing the images observable by means of the lenses 89 96, and when it is desired to employ such photographic apparatus the same will be inclosed in auxiliary boxes 107 and 108, (represented more clearly in Figs. 2, 22, and 23,) these boxes being connected with the main box 43, and the apparatus of the box 107 being intended for use in connection with the objective-lens 89, while the apparatus in the box 108 is intended for use in connection with the lens 96. The box 107 is provided with a downwardly-extending tube 109, which will carry at its lower end the usual or any suitable photographic lens, and the said tube 109 is in reasonably near relation to the lens 89, so that a person desiring to photograph objects directly below the instrument may make his observations through the lens 89 prior to or at the time of operating the photographic apparatus contained in the box 107. Within the box 107 I provide a shutter 110 for opening and closing the upper end of the tube 109, this shutter being more clearly illustrated in Fig. 23. The shutter 110 is in the form of a plate carried at the outer end of a hinged arm 111, and to this plate is connected a spring 112, which normally acts to hold the shutter closed over the tube 109, the end of the guide-plate 113 serving to arrest the shutter when it reaches its position directly over said tube. The means shown for opening the shutter 110 is an electromagnet 114, which when energized by the attendant on the platform 44 will attract to itself the said shutter 110, and thereby withdraw said shutter from over the tube 109. When the electromagnet 114 is deënergized, it will release the shutter 110 and permit the spring 112 to restore said shutter to its position over the tube 109. The electric wires for energizing and deënergizing the electromagnet 114 are of usual character and will extend from the switchboard 69 and through the space intermediate the outer and inner tubes 40 and 41, and the wiring for the electromagnet 114 is indicated by the wires $a\ a$. The present invention is not limited to any special character of film or photographic operating mechanism, since it is obvious that many known forms of cameras may be utilized within the box 107 and above the sight-tube 109. I therefore in Fig. 22 merely indicate diagrammatically at 115 a camera or that portion thereof for holding the film or plates, the movement of which toward and across the upper end of the tube 109 may be accomplished by any of the known methods, but preferably by means of electrical energy from the switchboard 69.

The box 108 is a duplicate of the 107 and contains the same photographic apparatus, shutter, and shutter-operating means as that just above described with respect to the box 107. Since, however, the tube 94 of the box 43 projects horizontally for taking observations in a horizontal direction, the tube 116 of the box 108 projects horizontally, and it is in near relation to the lens 96 for the tube 94, as indicated in Figs. 2 and 22. The operator on the platform 44 may observe on the reflector 97 images of the objects to be photographed by the camera within the box 108. The boxes 107 and 108 may have brackets 117 formed on them to receive electric lamps, and in any instance the electric lamps will be so disposed as to create the maximum amount of illumination. The boxes 107 and 108 may also be provided with sharp spurs or spikes 118 (shown in detail in Figs. 5 and 6) to protect the objective end of the instrument from the attacks of inhabitants of the sea. The boxes 107 108 contain the cameras and form dark chambers, the electric lamps being exterior to these boxes.

The operation of the instrument above described will be obvious from the foregoing description, and hence further detailed explanation of such operation is not required. I will, however, call attention to the fact that preliminary to the use of the instrument the air should be extracted therefrom, so as to prevent condensation on the lenses, for which reason the entire interior of the instrument intermediate the objective-lens of the telescope 65 and the lower or main objective extremity of the instrument is made air-tight. The joints of the telescope 65 are not made air-tight and are not necessary so to be constructed, because the exhaustion of the air takes place at a point below the lower end of the telescope 65, which is an auxiliary feature of the instrument and is in itself of well-known commercial construction.

The instrument above described is suspended from the platform 44 and is capable of axial motion upon the turn-table shown in Figs. 20 and 21, and the said platform 44 is intended to be suspended from over the side of a vessel by any suitable means. The ropes or cables 64 will be connected with any overhead support extending from the vessel, and their purpose is to aid in sustaining the instrument and prevent its being bent or injured by the action of the waves. The purpose of suspending the platform 44 by means of the spring-hanger shown in Fig 12 is to obviate as far as possible the swaying motion of the vessel from being communicated to said platform and the instrument suspended therefrom as well as to prevent any other jarring action of said platform and instrument. I do not, however, limit the invention as a whole to the employment of the suspended platform 44, since in many instances it may not be desirable to have the instrument exposed over the side of a vessel. In Figs. 26 and 27 I illustrate a portion of a vessel 119 containing a vertical tube 120, extending downwardly through its hold in line with an opening in the bottom of the vessel, this tube 120 being intended to receive the instrument of my invention and to permit the same to be lowered downwardly through the same when desired for the purpose of taking observations below the vessel. The tube 120 is a plain cylindrical tube and furnishes a housing for the submarine instrument of my invention, and the said tube 120 adjacent to its lower portion will be provided with a slide or gate valve 121 for closing the lower end of the tube when desired for the purpose of preventing the water from injuring the objective end of the instrument when the latter is not in use. The valve 121 will be provided with a threaded stem 122, so that it may be opened and closed by means of miter gear-wheels 123, operated from above by means of a rod 124. When my invention is employed in the manner indicated in Fig. 26, the objective end of the instrument will conform to the lower portion of the tube 120, and hence in Fig. 27 I illustrate the box 125 at the objective end of the instrument as being circular in horizontal cross-section and provided with spiral blades 126 on its outer surface to scrape any foreign matter from the interior walls of the tube 120. In Fig. 27 the numeral 127 denotes the objective-lens, and 128 the lamps for illuminating the region about said lens. I also provide the outer tube 40 of the instrument shown in Fig. 27 with a disk frame 129 for centering the instrument within said tube 120. When it is desired to use the instrument shown in Fig. 27, the same will be lowered down through the tube 120 until the objective end of the instrument is properly exposed below the vessel, and after such use of the instrument the latter will be withdrawn upwardly into the tube 120 and the gate-valve 121 closed.

When either form of the instrument hereinbefore described has its objective end in the water, air or air-globules are likely at times to collect about the outer face of the objective-lens and obscure the vision, and to avoid this result I provide an outlet-port 140 through the mounting of said lens, through which port the air and air-globules may escape. The port 140 should incline upwardly and outwardly from the face of a vertically-projected lens, as shown in Fig. 3, and when the lens is projected horizontally the said port should be placed in the mounting at the upper edge of the lens.

I contemplate the employment of the instrument on and in connection with vessels of all kinds, including submarine boats, and I may mention that in its employment on submarine boats the instrument may have its objective end turned upwardly above the surface of the water and observations and photographs made while the boat is submerged.

What I claim as my invention, and desire to secure by Letters Patent, is—

1. A submarine telescope having a lens at its objective end, means for illuminating the region about said lens, and means for extracting the air from within the telescope; substantially as set forth.

2. A submarine telescope having a lens at its objective end, combined with a box carried by the instrument at said objective end and having a photographic lens in reasonably near relation to said objective-lens, means exterior to said box for illuminating the region about the same, and means within said box and coöperating with said photographic lens for directly photographing the images observable by means of said objective-lens; substantially as set forth.

3. A submarine telescope having a lens at its objective end, combined with a box carried by the instrument at said objective end and having a photographic lens in reasonably near relation to said objective-lens, means exterior to said box for illuminating the region about the same, means within said box and coöperating with said photographic lens for directly photographing the images observable by means of said objective-lens, a shutter normally closed over said photographic lens, and electrical means for opening said shutter; substantially as set forth.

4. A submarine telescope having the outer barrel or tube, the inner observation-tube extending substantially throughout the length of said outer tube, means for maintaining said inner tube and spacing it from said outer tube, a lens at the objective end of the instrument, and electric lamps for illuminating the region about said objective end, the electric wires for said lamps being admitted through the space between said inner and outer tubes; substantially as set forth.

5. A submarine telescope having the outer barrel or tube, the inner observation-tube extending substantially throughout the length of said outer tube, means for maintaining said inner tube and spacing it from said outer tube, a lens at the objective end of the instrument, electric lamps for illuminating the region about said objective end, a box carried by the instrument at its objective end and having a photographic lens in reasonably near relation to said objective-lens, means within said box and coöperating with said photographic lens for directly photographing the images observable by means of said objective-lens, a shutter normally closed over said photographic lens, and electrical means for opening said shutter, the electric wires for said lamps and photographing apparatus being admitted through the space between said outer and inner tubes; substantially as set forth.

6. A telescope comprising the outer barrel or tube, the inner observation-tube extending substantially throughout the length of said outer tube, means for maintaining said inner tube and spacing it from said outer tube, a box carried by the instrument at its objective end and having a lens, and a reflector within said box in line with said lens and said inner tube; substantially as set forth.

7. A telescope comprising the outer and inner tubes and having at its objective end a box, a reflector therein in line with said inner tube, a lens for coöperation with said reflector, means adjacent to said lens for photographing the images refracted through the same, and means for illuminating the region about said box; substantially as set forth.

8. A submarine telescope having at its objective end a lens in line with the tube of the instrument, a lens disposed at an angle thereto, a reflector for receiving the images presented by said last-mentioned lens, and means for moving said reflector to position in line with said tube and from such position; substantially as set forth.

9. A submarine telescope having at its objective end a box, a lens carried by said box and projected horizontally, a reflector within said box at an angle of forty-five degrees to the tube of the instrument and to the line of said lens, means for illuminating the region about said box, and means carried by said box for directly photographing the objects observed through the instrument; substantially as set forth.

10. A submarine telescope having at its objective end a lens in line with the tube of the instrument, a lens projected at an angle thereto, a reflector for receiving the images from said last-mentioned lens, means for moving said reflector to and from position in line with said tube, and independent means adjacent to each of said lenses for directly photographing the images observable therethrough; substantially as set forth.

11. A submarine telescope having at its objective end a lens in line with the tube of the instrument, a lens projected at an angle thereto, a reflector for receiving the images from said last-mentioned lens, means for moving said reflector to and from position in line with said tube, and a turn-table supporting the instrument from its upper portion and permitting the same to be turned axially; substantially as set forth.

12. A submarine telescope having at its objective end a box, a reflector therein in line with the tube of the instrument, a lens carried by said box in line and for coöperation with said reflector, means for illuminating the region about said box, and a turn-table supporting the instrument from its upper portion and permitting the same to be turned axially; substantially as set forth.

13. A telescope comprising the inner and outer tubes and having adjacent to its eyepiece end a switchboard and a box to which the outer tube is connected, and provided at its outer end with a lens and electric lamps for illuminating the region about said lens, said box forming a chamber leading to the space between said tubes for receiving the electric wires which pass from said switchboard to the lamps; substantially as set forth.

14. A telescope comprising the inner and outer tubes and having adjacent to its eyepiece end a switchboard and a box to which the outer tube is connected, and provided at its outer end with a lens, electric lamps, and electrically-operated photographic apparatus, said box forming a chamber leading to the space between said tubes for receiving the electric wires which pass from said switchboard to said photographic apparatus and lamps; substantially as set forth.

15. The platform and means for yieldingly suspending the same, combined with a submarine telescope extended through said platform and having an eyepiece at its upper end and a lens at its lower end, with means for illuminating the region about said lower end; substantially as set forth.

16. The platform having a turn-table thereon, combined with a submarine telescope extended through said platform and mounted on said turn-table and having an eyepiece at its upper end, and at its lower end carrying a box containing a reflector in line with said eyepiece and having a horizontally-projected lens in line with said reflector; substantially as set forth.

17. A telescope comprising a tubular body portion having a telescope at one end and a lens at the other end and being air-tight between said end portions, combined with means for extracting the air from within the instrument to thereby prevent condensation on the lens; substantially as set forth.

18. A submarine telescope having a lens at its objective end and provided in the mounting of said lens with an escape-port for such air or air-globules as may gather about the outer face of said lens; substantially as set forth.

Signed at New York city, in the county of New York and State of New York, this 12th day of November, A. D. 1904.

EDWARD A. TRAPP.

Witnesses:
CHAS. C. GILL,
ARTHUR MARION.